Oct. 5, 1965 B. H. COMSTOCK 3,210,697

STRIP TRANSMISSION LINE TUNING DEVICES

Filed Dec. 30, 1963 2 Sheets-Sheet 1

OPEN CIRCUIT STUB

SHORT CIRCUIT STUB

INVENTOR.
BILL H. COMSTOCK
BY
C. A. Gulbrandsen
ATTY.

STRIP TRANSMISSION LINE TUNING DEVICES

Filed Dec. 30, 1963 2 Sheets-Sheet 2

INVENTOR.

BILL H. COMSTOCK

BY

O. A. Gulbrandsen

ATTY.

3,210,697

STRIP TRANSMISSION LINE TUNING DEVICES

Bill H. Comstock, Millbrae, Calif., assignor, by mesne assignments, to Automatic Electric Laboratories, Inc., Northlake, Ill., a corporation of Delaware Filed Dec. 30, 1963, Ser. No. 334,147
8 Claims. (Cl. 333—81)

This invention relates in general to electromagnetic wave impedance matching devices and more particularly to tunable stubs in strip transmission lines.

The use of planar transmission lines of the strip line type has greatly increased in the past few years as a replacement for the heavier and more cumbersome forms of transmission lines, such as waveguides and coaxial cables. Strip transmission line or simply strip line as used in describing the present invention, refers to the class of planar transmission lines which consist of two outer outer conducting ground plane 11, and a much narrower with dielectric material between the inner and outer conductors.

Strip line is now often used where reduced physical size of a system is of prime importance. It becomes necessary at times to place in such a system transmission line tuners to obtain variable impedances. Initially conventional coaxial components were utilized, however, these added appreciably to the physical size and mechanical complexity of the system.

Variable impedance matching devices of the strip line type were devised, but they either necessitated the slotting of the dielectric material, which causes a discontinuity in the dielectric and related impedance variations, or the structures were cumbersome and tended to offset the strip line advantage of small size and simplicity.

It is, therefore, an object of the present invention to provide a variable impedance matching device whose size will complement the use of strip transmission line.

It is a further object of the present invention to provide a variable impedance matching device whose variable portion is entirely contained within the strip line complex.

It is a further object of the present invention to provide an impedance matching device for strip line which is variable over its entire range without the displacement of basic dielectric material.

It is a further object of the present invention to provide an impedance matching device for strip line which will introduce a minimum of contact noise.

Other objects and a fuller understanding of the invention may be had by referring to the following description and claims of preferred embodiments of the invention taken in conjunction with the accompanying drawings in which:

Figure 1:
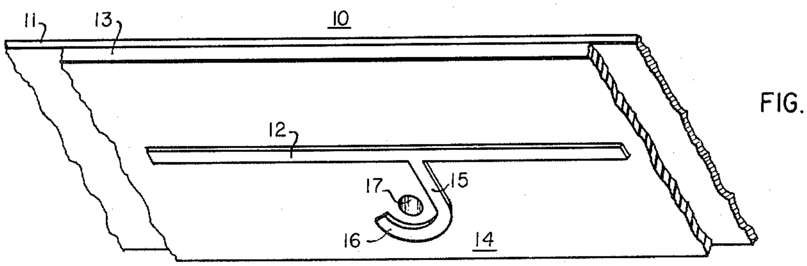
FIGS. 1 and 2 show the upper and lower half respectively, of a tunable section of strip transmission line according to the present invention.
Figure 2:
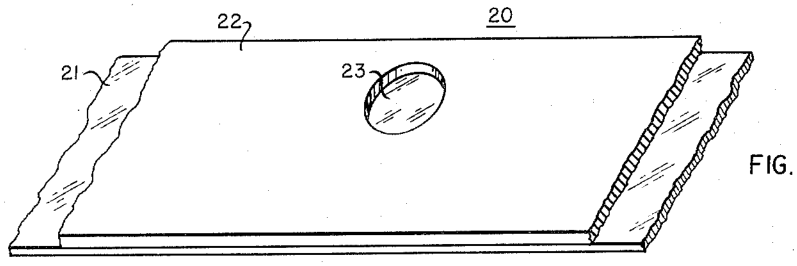

In FIG. 1 there is shown the upper half 10 of a modified section of strip transmission line which contains an outer conducting ground plane 1, and a much narrower center conductor 12. Dielectric material 13 is placed in between the conductors 11 and 12, in accordance with well known strip line techniques. A fixed section of conductor or stub 14, having a straight shaft portion 15 and an arcuate portion 16 of approximately 120° is placed on the dielectric 13, transverse to the inner conductor 12. At the center of the circle described partially by arcuate portion 16 there is an aperture 17 in both the dielectric material 13 and the outer ground plane 11. In FIG. 2 the lower half 20 of a modified section of strip transmission line contains an outer conducting ground plane 21, and dielectric material 22 having a circular aperture 23 located so that the arcuate portion 16 is an arc of circular aperture 23.

Figure 3:
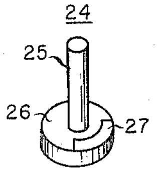
FIG. 3 is a three dimensional view of the rotating section of an open stub type tuning device according to the invention.

The rotating section of an open circuited stub 24 is shown in FIG. 3. The rod 25 may be made of dielectric material and is mechanically connected to the dielectric disc 26. Dielectric disc 26 has bonded to its a movable arcuate conductor portion 27 which is the samed radius as the fixed arcuate portion 16 and also extends for approximately 120°.

Figure 4:
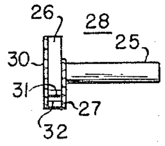
FIG. 4 is a side view of the rotating section of a shorted stub type tuning device according to the invention.

In FIG. 4 there is shown the rotating section of a shorted stub 28. Similar numbers in FIGS. 3 and 4 are used to denote similar components. The movable arcuate portion of stub 29 and the shorting conductor 30 are attached to each other by shorting connector 31, through aperture 32.

Figure 5:
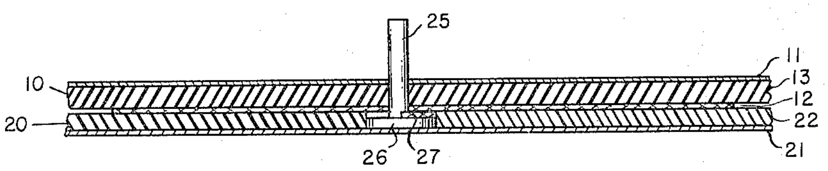
FIG. 5 is a cross section of the adjustable stub tuner of FIGS. 1 and 2 assembled in strip transmission line in accordance with the invention.

To illustrate the physical relation among the components, specific reference may be made to FIG. 5, which shows a cross section of a rotating section of an open circuited stub 24 assembled in strip transmission line having an upper half 10 and lower half 20. Dielectric disc 26 is accommodated by aperture 23 so that the movable arcuate portion of stub 27 is in contact with and rotates in the same arc as the fixed arcuate portion 16. Thus effectively, the fixed stub 14 is increased or decreased in length by rotating the rod 25 which extends through aperture 17 and the upper half of transmission line 10.

Where an adjustable shorted stub tuner is desired, rotating section 28 may replace 24 in FIG. 5. In that case there would be complete shorting of fixed stub 14 to ground planes 11 and 21 via contact of fixed arcuate portion 16 with the movable arcuate portion 27, through connector 31 and the shorting conductor 30, to ground plane 21.

It may be noted that the particular construction of this invention, that is the placing of the movable element into the dielectric material of the transmission line, allows the adjustable stub to be entirely contained within the strip line complex and to be varied without the displacement of basic strip line dielectric material. Also since in the use of the open circuited stub there is only one contact surface, the movable section 27 with fixed section 16, the possibility of contact noise being generated is greatly reduced.

In accordance with well known transmission line principles, the adjustable stub section may be used as an impedance matching device or tuner. Briefly, the section may be positioned in a transmission line between a generator and a load at such a point that by varying the electrical length of fixed stub 14 with shaft rotation, a position will be found where reflections on the line may be cancelled.

For some purposes a somewhat better arrangement than the single stub is to have two fixed and two variable sections of stub projecting from center conductor 12, in a double stub tuner configuration. Thus although only a single adjustable stub has been heretofore illustrated, it is obvious to one skilled in the art that multiple stub tuners may be constructed using the principles of this invention.

Figure 6:
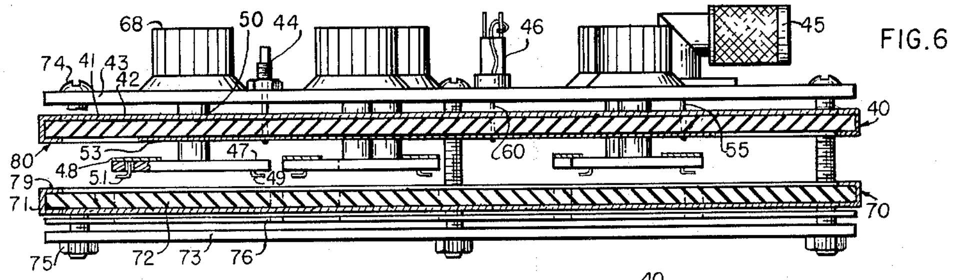
FIG. 6 is an expanded side view of a strip transmission line frequency multiplier incorporating the principles of the present invention showing a section view of the dielectric sheets and the ground plane conductors.

In FIG. 6 there is shown an expanded view of a stripline frequency multiplier incorporating in a single stripline complex, a varactor multiplier and the necessary adjustable stub tuners of the type described by the present invention. The top half of the multiplier includes an assembly 40 having two ounces of copper forming ground plane 41 bonded to ⅛″ dielectric material 42. Top supporting plate 43 is a ⅛″ aluminum plate to hold the unit rigidly together and to form a surface for the various mounting therein. Mounted on this plate 43 are input connector 44, output connector 45, and standoff insulator 46, which is used in furnishing bias voltage to the unit. The rotating section of the stub tuner includes dielectric disc 47 and movable arcuate portion 48 mounted thereon. Finger stock contacts 49 are mounted on the underside of disc 47 to provide positive contact between conducting portions of the unit.

Rod 50 which may be made of dielectric material is connected to dielectric disc 47. Knob 68 is mounted on rod 50 and is used to conveniently rotate rod 50 and the corresponding dielectric disc 47.

Figure 10:
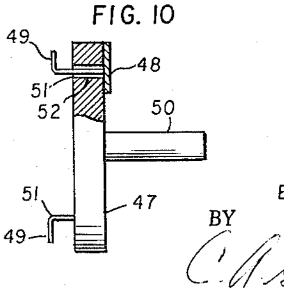
FIG. 10 is an enlarged view of the tuning stub of FIG. 6.

For a shorting stub the contacts 49 may be electrically connected to the movable arcuate portion 48 by shorting connector 51 through aperture 52, which is shown more clearly in FIG. 10 and which is similar to the shorting stub illustrated in FIG. 4. If an open stub is desired, this can be obtained by simply omitting the shorting connector 51.

The bottom half of the multiplier also has an assembly 70 including copper ground plane 71 bonded to dielectric material 72. Bottom support plate 73 is a ⅛″ aluminum plate, and in conjunction with top plate 43, screws 74, and nuts 75, hold the unit rigid. Spacer 76 is a $\frac{1}{16}$″ or other required thickness aluminum plate to compensate for the thickness of the various multiplier elements.

Figure 7:
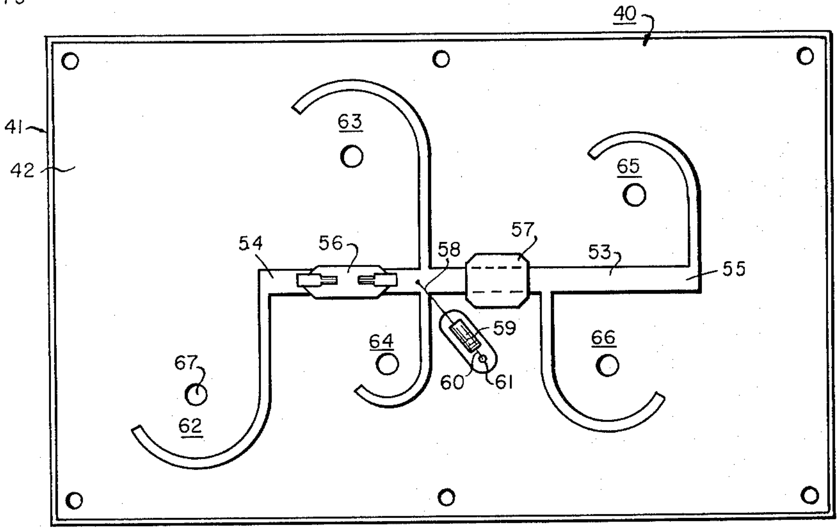
FIG. 7 is a view of a modification of the bottom of sheet 40 of FIG. 6.

Assembly 40 is also shown in FIG. 7 to illustrate the layout of the fixed stubs. Stripline center conductor 53 is connected at one end to center conductor 54 of input connector 44, and to center conductor 55 of output connector 45 at the other end. Varactor diode mounting 56, blocking capacitor 57, and lead 58 of bias resistor 59 are also connected to center conductor 53. Lead 60 of bias resistor 59 is connected to standoff insulator 46 through aperture 61 in the dielectric material 42, ground plane 41, and top supporting plate 43.

The fixed section of stubs 62, 63, 64, 65, 66 are in accordance with principles of the invention in that they each have a straight section transverse to the center conductor 53, and an arcuate portion of approximately 120°.

Tuning stub 62 and its associated rotating portion are used to match the varactor diode impedance at mounting 56, to the impedance of the original frequency source connected to input connector 44.

Similarly tuning stubs 63 and 64 and their associated rotating portions can be used to present variable susceptances at the point where bias resistor lead 58 is attached to center conductor 53. Fixed stubs 65 and 66 and their associated rotating sections form a double stub tuner to match the stripline output impedance at the multiplied frequency to a load which may be connected to output connector 45.

Aperture 67 accommodates the rod 50 through dielectric 42, ground plane 41, and top supporting plate 43, so that it may be rotated by knob 68.

Figure 8:
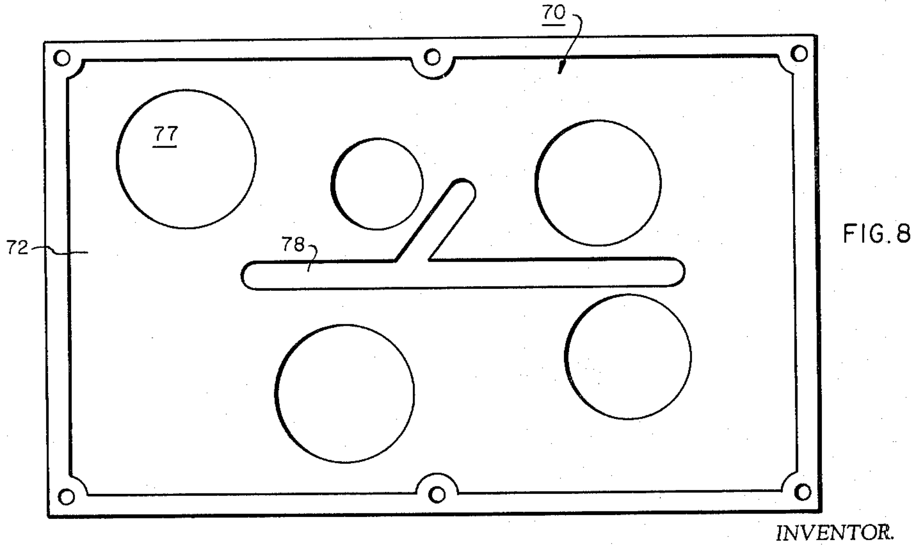
FIG. 8 is a view of the top of sheet 70 of FIG. 6.

In FIG. 8 is illustrated the bottom half of the multiplier, having aperture 77 through the dielectric material 72, ground plane 71, and spacer 76 to accommodate disc 47 of the rotating section of the stub. A trench 78 is milled out of dielectric 72, allowing varactor mounting 56, bias resistor 59, and other projections from center conductor 53, to be incorporated therein.

The electrical connection between ground planes 41 and 71 may be obtained by various means. FIG. 8 shows the copper ground plane 71 as continuing around the sides of dielectric material 72 and becoming a thin copper edge 79 on the top surface of dielectric 72. Ground plane 41 may be similarly shaped in which case a thin copper edge 80 would be formed on the bottom surface of dielectric 42, as shown in FIG. 6. Both ground planes would thus be in electrical contact throughout their entire length.

Figure 9:
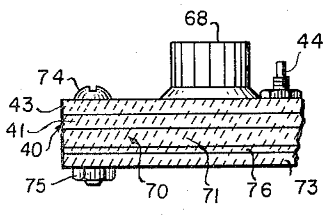
FIG. 9 is a section of a strip transmission line frequency multiplier in assembled form.

Another convenient method would be to continue the ground planes 41 and 71 only around the side of dielectric material 42 and 72 respectively, as shown in FIG. 7 for only the top half 40. FIG. 9 illustrates a section of the stripline configuration in assembled form, with ground planes 41 and 71 continuing only around the sides of dielectric material 42 and 72 respectively. A conducting silver paint is then placed along the longitudinal edges to form a continuous electrical connection between ground planes 41 and 71.

A combination of these two methods may also be used where one ground plane would be constructed as in FIG. 7 and the other as in FIG. 8. Conducting silver paint could then be used to electrically connect the ground planes together throughout their length.

It is to be understood that the above-described arrangements are given only by way of illustration of the principles of the present invention, and that various other arrangements can be devised by those skilled in the art in accordance with these principles without departing from the scope of the invention as hereinafter claimed.

What is claimed is:

1. A strip transmission line tuning device having a pair of outer planar conductors, a single relatively narrow inner conductor, a pair of sheets of dielectric material equally spacing said outer conductors from said inner conductor, one of said sheets having a circular aperture therein, and a fixed tuning section and a movable tuning section, said fixed section comprising a conductive stub extending from said inner conductor and having an arcuate portion, and said movable section comprising a generally disc-shaped member of dielectric material received by and rotatably mounted in said aperture, an arcuate conductor carried on one side of said member adjacent to and in slidable contact with the arcuate portion of said conductive stub, the other side of said member bearing on the corresponding one of said outer planar conductors, and means for rotating said member and arcuate conductor.

2. A strip transmission line tuning device as claimed in claim 1, in which said conductive stub also has an elongated shaft portion from which said arcuate portion extends.

3. A strip transmission line tuning device as claimed in claim 1, in which said movable section also includes a shorting conductor mounted on said other side of said member of dielectric material so as to be in slidable contact with said corresponding one of said outer planar conductors, and means electrically connecting said shorting conductor to said arcuate conductor.

4. A strip transmission line tuning device as claimed in claim 1, in which there are provided apertures in said other sheet of dielectric material and its corresponding outer planar conductor, and in which said means for rotating said member and arcuate conductor comprises a rod of dielectric material mounted on said disc-shaped member of dielectric material coaxially therewith, said rod extending through said apertures, and means for rotating said rod.

5. A strip transmission line tuning device as claimed in claim 1, wherein each of said planar conductors has edges normal to its plane for providing each said planar conductor with a U-shaped cross-section, each of said dielectric sheets being disposed within the U of a separate planar conductor, and wherein said tuning device further comprises means for electrically connecting said edges of said planar conductors.

6. A transmission line tuning device comprising a strip conductor including a fixed tuning section extending therefrom, a pair of dielectric sheets on opposite sides of said strip conductor, one of said sheets having an aperture therein, a pair of planar conductors on the sides of said dielectric sheets opposite said strip conductor and each said planar conductor including edge portions which overlap the edge of the corresponding dielectric sheet and lie on the strip conductor side of said dielectric sheet, another tuning section movably mounted in said aperture, a tuning conductor carried by said other tuning section in slidable contact with said fixed tuning section, means for moving said other tuning section and means for holding said edge portions of said planar conductors in electrical contacting relationship.

7. A transmission line tuning device as claimed in claim 6, wherein the planar conductor associated with said apertured dielectric sheet has an aperture aligned with the aforementioned aperture, and wherein said tuning device comprises another planar conductor parallel to and spaced from and electrically connected to said apertured planar conductor, said movable other tuning section bearing on said other planar conductor.

8. A transmission line tuning device as claimed in claim 7, comprising conductive means mounted on said other tuning section, said conductive means being electrically connected to said tuning conductor and in slidable contact with said other planar conductor.

References Cited by the Examiner

UNITED STATES PATENTS 2,961,622 11/60 Sommers .............. 333—84

ELI LIEBERMAN, *Acting Primary Examiner.*

HERMAN KARL SAALBACH, *Examiner.*